United States Patent
Choi et al.

(10) Patent No.: US 8,900,736 B2
(45) Date of Patent: *Dec. 2, 2014

(54) BATTERY PACK OF IMPROVED DURABILITY

(71) Applicant: LG Chem, Ltd., Seoul (KR)

(72) Inventors: Junseok Choi, Daejeon (KR); Bumhyun Lee, Seoul (KR); Sangyoon Jeong, Daejeon (KR); Jong Moon Yoon, Daejeon (KR); Jin Kyu Lee, Busan (KR)

(73) Assignee: LG Chem, Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/856,738

(22) Filed: Apr. 4, 2013

(65) Prior Publication Data

US 2013/0224548 A1   Aug. 29, 2013

Related U.S. Application Data

(63) Continuation of application No. PCT/KR2011/007954, filed on Oct. 25, 2011.

(30) Foreign Application Priority Data

Oct. 27, 2010 (KR) .................... 10-2010-0105320

(51) Int. Cl.
  *H01M 2/10* (2006.01)
  *H01M 10/04* (2006.01)
(52) U.S. Cl.
  CPC ........ *H01M 2/1077* (2013.01); *H01M 10/0481* (2013.01); *H01M 2/1083* (2013.01)
  USPC ........................................... 429/99

(58) Field of Classification Search
  USPC ............................................. 429/99
  See application file for complete search history.

(56) References Cited

U.S. PATENT DOCUMENTS

| | | | |
|---|---|---|---|
| 2006/0028170 A1* | 2/2006 | Izawa | 320/107 |
| 2009/0142650 A1 | 6/2009 | Okada et al. | |
| 2013/0186700 A1* | 7/2013 | Choo et al. | 180/65.1 |
| 2013/0341107 A1* | 12/2013 | Choo et al. | 180/65.1 |

FOREIGN PATENT DOCUMENTS

| | | | |
|---|---|---|---|
| JP | 2006-185815 A | | 7/2006 |
| KR | 10-2007-0080861 A | | 8/2007 |
| KR | 10-2007-0091387 A | | 9/2007 |
| KR | 10-2007-0112490 A | | 11/2007 |
| KR | 10-2008-0027504 A | | 3/2008 |
| KR | 10-2008-0034625 A | | 4/2008 |
| KR | 10-2009-0010426 A | | 1/2009 |
| WO | WO 2009/002096 A1 | | 12/2008 |

OTHER PUBLICATIONS

International Search Report issued in PCT/KR2011/007954, mailed on May 29, 2012.

* cited by examiner

*Primary Examiner* — Patrick Ryan
*Assistant Examiner* — Lucas J O Donnell
(74) *Attorney, Agent, or Firm* — Birch, Stewart, Kolasch & Birch, LLP

(57) ABSTRACT

Disclosed herein is a battery pack including a bracket coupled between at least one side supporting member and a rear mounting member to distribute load of battery modules to a rear mounting member via the at least one side supporting member, thereby effectively supporting vibration of the battery pack in a forward and backward direction and load of the battery pack.

17 Claims, 4 Drawing Sheets

BATTERY PACK OF IMPROVED DURABILITY

CROSS REFERENCE TO RELATED APPLICATIONS

This application is a Continuation of PCT International Application No. PCT/KR2011/007954 filed on Oct. 25, 2011, which claims priority under 35 U.S.C. §119(a) to Patent Application No. 10-2010-0105320 filed in the Republic of Korea on Oct. 27, 2010, all of which are hereby expressly incorporated by reference into the present application.

TECHNICAL FIELD

The present invention relates to a battery pack exhibiting improved durability, and, more particularly, to a battery pack including a battery module array having battery modules arranged in a lateral direction in two or more rows, a pair of side supporting members to support the front and rear of the battery module array, two pairs of lower end supporting members to support lower ends of the battery modules, two or more first upper mounting members coupled to upper ends of the side supporting members and lower ends of the battery modules, a second upper mounting member coupled to upper ends of first upper mounting members such that the second upper mounting member intersects the first upper mounting members at right angles, a rear mounting member disposed at the rear of the battery module array, opposite ends of the rear mounting member being fastened to an external device, and a bracket coupled between at least one of the side supporting members and the rear mounting member to distribute load of the battery modules to the rear mounting member via the side supporting members.

BACKGROUND ART

One of the biggest problems caused by vehicles using fossil fuel, such as gasoline and diesel oil, is the creation of air pollution. A technology of using a secondary battery, which can be charged and discharged, as a power source for vehicles has attracted considerable attention as one method of solving the above-mentioned problem. As a result, electric vehicles (EV), which are operated using only a battery, and hybrid electric vehicles (HEV), which jointly use a battery and a conventional engine, have been developed. Some electric vehicles and hybrid electric vehicles are now being commercially used. A nickel-metal hydride (Ni-MH) secondary battery has been mainly used as the power source for electric vehicles (EV) and hybrid electric vehicles (HEV). In recent years, however, a lithium-ion battery has been used.

High power and large capacity are needed for such a secondary battery to be used as the power source for the electric vehicles (EV) and the hybrid electric vehicles (HEV). To this end, a plurality of small-sized secondary batteries (unit cells) is connected in series to each other so as to form a battery module and a battery pack. According to circumstances, a plurality of small-sized secondary batteries (unit cells) is connected in series and in parallel to each other so as to form a battery module and a battery pack.

Generally, such a battery pack has a structure to protect battery modules, each of which has secondary batteries mounted therein. The structure of the battery module may be varied based on the kind of vehicles or installation position of the battery pack in the vehicles. One of the structures to effectively fix large-capacity battery modules is based on supporting bars and end plates. This structure is advantageous in that movement of the battery modules is minimized even when load is applied toward the supporting bars. To this end, however, it is necessary to sufficiently secure rigidity of the supporting bars and end plates.

In connection with this case, a conventional battery pack including a single battery module is illustratively shown in a perspective view of FIG. 1.

Referring to FIG. 1, a battery pack 100 includes unit modules 10, each of which has secondary batteries mounted therein, a base plate 20, a pair of end plates 30, and supporting bars 40.

The unit modules 10 are stacked at the top of the base plate 20 in a state in which the unit modules 10 are vertically erected. The end plates 30 are disposed in tight contact with the outer sides of the outermost unit modules 10 in a state in which the lower end of each of the end plates 30 is fixed to the base plate 20.

The supporting bars 40 are connected between the upper parts of the end plates 30 so as to interconnect and support the end plates 30.

However, the battery pack with the above-stated construction does not include a structure to support the battery pack in the front and rear direction of the battery pack when external force is applied to the battery pack in the front and rear direction of the battery pack with the result that it is not possible to prevent deformation of the battery pack.

Therefore, there is a high necessity for a battery pack including battery modules arranged in two or more rows to provide high power and large capacity configured to have a specific structure in which durability of the battery pack is secured from vibration and impact and the battery pack is compact.

DISCLOSURE

Technical Problem

Therefore, the present invention has been made to solve the above problems, and other technical problems that have yet to be resolved.

Specifically, it is an object of the present invention to provide a battery pack including a bracket coupled between side supporting members and a rear mounting member, thereby distributing load of battery modules to the rear mounting member via the side supporting members.

It is another object of the present invention to provide a battery pack including a battery module array assembled to first upper mounting members, a second upper mounting member, lower end support members, and a rear mounting member, which are formed in the shape of a quadrangular pipe, thereby supporting weight of the battery pack through the quadrangular pipe-shaped members and configuring the battery pack to have a compact structure.

It is a further object of the present invention to provide a battery pack having a structure in which a portion of the battery pack is formed using some of the shape of a vehicle such that the battery pack is stably installed in the vehicle and the volume of the battery pack in the vehicle is minimized.

Technical Solution

In accordance with one aspect of the present invention, the above and other objects can be accomplished by the provision of a battery pack including (a) a battery module array having battery modules arranged in two or more rows, each of the battery modules being configured to have a structure in which battery cells or unit modules, each of which has two or more battery cells mounted therein, stacked in a state in which the battery cells or the unit modules are erected in an upside-down fashion, (b) a pair of side supporting members (a front supporting member and a rear supporting member) to support the front and rear of the battery module array, respectively, in tight contact with outermost battery modules of the battery module array, (c) lower end supporting members coupled to lower ends of the side supporting members to support the lower end of the battery module array, (d) two or more first upper mounting members coupled to upper ends of the side supporting members and lower ends of the battery modules, one end of each of the first upper mounting members being fastened to an external device, (e) a second upper mounting member coupled to upper ends of first upper mounting members such that the second upper mounting member intersects the first upper mounting members at right angles, opposite ends of the second upper mounting member being fastened to the external device, (f) a rear mounting member disposed at the rear of the battery module array, opposite ends of the rear mounting member being fastened to the external device, and (g) a bracket coupled between at least one of the side supporting members and the rear mounting member to distribute load of the battery modules to the rear mounting member via the side supporting members.

In the battery pack according to the present invention, the bracket is coupled between at least one of the side supporting members disposed in tight contact with outermost battery modules of the battery module array and the rear mounting member to distribute load of the battery modules in the forward and backward direction, thereby improving structural characteristics of the battery pack, particularly durability of the battery pack against vibration.

Also, opposite ends of the rear mounting member and the second upper mounting member and one end or opposite ends of each of the first upper mounting members are fastened to the external device. Consequently, the battery pack can be easily and stably mounted to the external device.

In addition, the side supporting members support opposite sides of the battery module array. Consequently, it is possible to securely increase bending rigidity of the lower end supporting member coupled to the lower ends of the side supporting members and to sufficiently secure structural reliability of the battery pack against vertical vibration.

For reference, directions mentioned in this specification are expressed as front, rear, left, right, top, and bottom in a state in which the battery module array is seen through from the front of the battery module array (C of FIG. 2).

In the present invention, each of the unit modules may be a secondary battery or a small-sized module having two or more secondary batteries mounted therein. An example of a unit module having two or more secondary batteries mounted therein is disclosed in Korean Patent Application No. 2006-12303, which has been filed in the name of the applicant of the present application. In the disclosure of this patent application, the unit module is configured to have a structure in which two secondary batteries are mounted to a frame member having input and output terminals in a state in which the secondary batteries are in tight contact with each other such that the secondary batteries face each other.

Another example of the unit module is disclosed in Korean Patent Application No. 2006-20772 and No. 2006-45444, which have also been filed in the name of the applicant of the present application. In the disclosure of each of these patent applications, the unit module is configured to have a structure in which outer sides of two secondary batteries are covered with a pair of high-strength cell covers in a state in which the secondary batteries are in tight contact with each other such that the secondary batteries face each other.

The disclosures of the above patent applications are incorporated herein by reference. Of course, however, the structure of each of the unit modules of each battery module according to the present invention is not limited to the above examples of the unit modules disclosed in the above patent applications.

Preferably, each of the battery cells is a plate-shaped battery cell, which provides a high stack rate in a limited space. For example, each of the battery cells may be configured to have a structure in which an electrode assembly is mounted in a battery case formed of a laminate sheet.

Specifically, each of the battery cells is a pouch-shaped secondary battery in which an electrode assembly of a cathode/separator/anode structure is disposed in a battery case together with an electrolyte in a sealed state. For example, each of the battery cells may be a plate-shaped secondary battery configured in an approximately hexahedral structure having a small thickness to width ratio. Generally, the pouch-shaped secondary battery includes a pouch-shaped battery case. The battery case is configured to have a laminate sheet structure in which an outer coating layer formed of a polymer resin exhibiting high durability, a barrier layer formed of a metallic material blocking moisture or air, and an inner sealant layer formed of a polymer resin that can be thermally welded are sequentially stacked.

Meanwhile, the shape of each of the side supporting members is not particularly restricted so long as the side supporting members can easily support the front and rear of the battery module array. For example, each of the side supporting members may be formed in a rectangular shape on plane.

A lower plate, opposite ends of which are coupled to the side supporting members, may be further mounted to lower parts of the lower end supporting members to prevent downward movement of the battery module array in cooperation with the lower end supporting member when external force is applied to the battery pack.

In a preferred example, in a case in which the battery modules are arranged in two rows to constitute a battery module array, the lower end supporting member may include four members to support the lower ends of the opposite sides of the respective battery modules.

The structure of each of the first upper mounting members is not particularly restricted so long as the first upper mounting members can easily mounted to the lower ends of the battery modules erected in an upright or upside-down fashion. For example, the first upper mounting members may include two end members coupled to opposite ends of the battery module array and a middle member coupled to the middle of the battery module array. Consequently, it is possible for the first upper mounting members to uniformly support weight of the battery module array.

The end of each of the first upper mounting members fastened to the external device may be bent upward by a height of the second upper mounting member, coupled to the upper ends of the first upper mounting members. As a result, the end of the ends of the first upper mounting members and the top of the second upper mounting member may be disposed at the same height.

According to circumstances, the battery pack may further include an upper plate mounted between the battery module array and the first upper mounting members to reinforce the top of the battery module array.

In an example of the above structure, the battery module array may be coupled to the upper plate fixed to the lower ends of the first upper mounting members such that weight of the battery module array is supported by the first upper mounting members.

In another example, portions of the upper plate corresponding to the first upper mounting members may be depressed to lower the overall height of the battery pack.

Meanwhile, the battery pack may include an electrically wired structure. Consequently, the lower plate may extend to the rear of the rear mounting member to secure a space through which a wire, such as an electric wire, extends.

According to circumstances, the other end of each of the upper mounting members may be coupled to the upper end of the rear mounting member to increase coupling force between the first upper mounting members and the rear mounting member.

In an example, the structure of the rear mounting member is not particularly restricted so long as the rear mounting member can easily cover opposite sides and the bottom of a cooling fan mounted at the front of the battery module array. Preferably, the rear mounting member is configured to have a U-shaped frame structure.

In another example, the opposite ends of the rear mounting member may be bent in parallel to the second upper mounting member for easy coupling to the external device, and fastening holes may be formed at the bent portions of the rear mounting member.

In a preferred example, the bracket may have one end coupled to the side supporting members and the other end coupled to the rear mounting member, and the bracket may be bent so as to correspond to a space between the side supporting members and the rear mounting member, to which the bracket is mounted.

In another preferred example, the bracket may be coupled to the rear mounting member adjacent to the front supporting member in a symmetrical fashion.

According to the present invention, therefore, the front supporting member and the rear mounting member support the battery modules via the bracket, thereby easily preventing drooping of the battery pack due to load of the battery pack in the forward and backward direction of the battery pack and deformation of the lower plate.

The bracket may have various shapes depending upon desired structure of the battery pack.

The shape of the bracket is not particularly restricted so long as the bracket can easily support the battery pack. For example, the bracket may be a triangular bracket, a quadrangular bracket, and a step type bracket.

In a concrete example, the triangular bracket may have one end coupled to the front supporting member and the other ends coupled to the rear mounting member.

Consequently, load of the battery pack may be supported by the rear mounting member coupled by the triangular bracket.

In another concrete example, the step type bracket may have one end coupled to the front supporting member and the other end coupled to the bottom of the rear mounting member.

In the above structure, an auxiliary bracket may be mounted between a pair of step type brackets.

Consequently, load of the battery pack is uniformly supported by the three brackets, thereby further improving durability of the battery pack against vibration.

In accordance with another aspect of the present invention, there is provided a vehicle using the battery pack with the above-stated construction as a power source, having a limited installation space, and exposed to frequent vibration and strong impact.

Of course, the battery pack used as the power source of the vehicle may be combined and manufactured based on desired power and capacity.

In this case, the vehicle may be an electric vehicle, a hybrid electric vehicle, or a plug-in hybrid electric vehicle.

For example, the battery pack is installed in the lower end of a trunk of the vehicle or between a rear seat and the trunk of the vehicle.

The electric vehicle, the hybrid electric vehicle, or the plug-in hybrid electric vehicle including the battery pack as the power source thereof are well known in the art to which the present invention pertains, and therefore, a detailed description thereof will be omitted.

BRIEF DESCRIPTION OF DRAWINGS

The above and other objects, features and other advantages of the present invention will be more clearly understood from the following detailed description taken in conjunction with the accompanying drawings, in which.

DETAILED DESCRIPTION OF THE INVENTION

Now, exemplary embodiments of the present invention will be described in detail with reference to the accompanying drawings. It should be noted, however, that the scope of the present invention is not limited by the illustrated embodiments.

Figure 1:
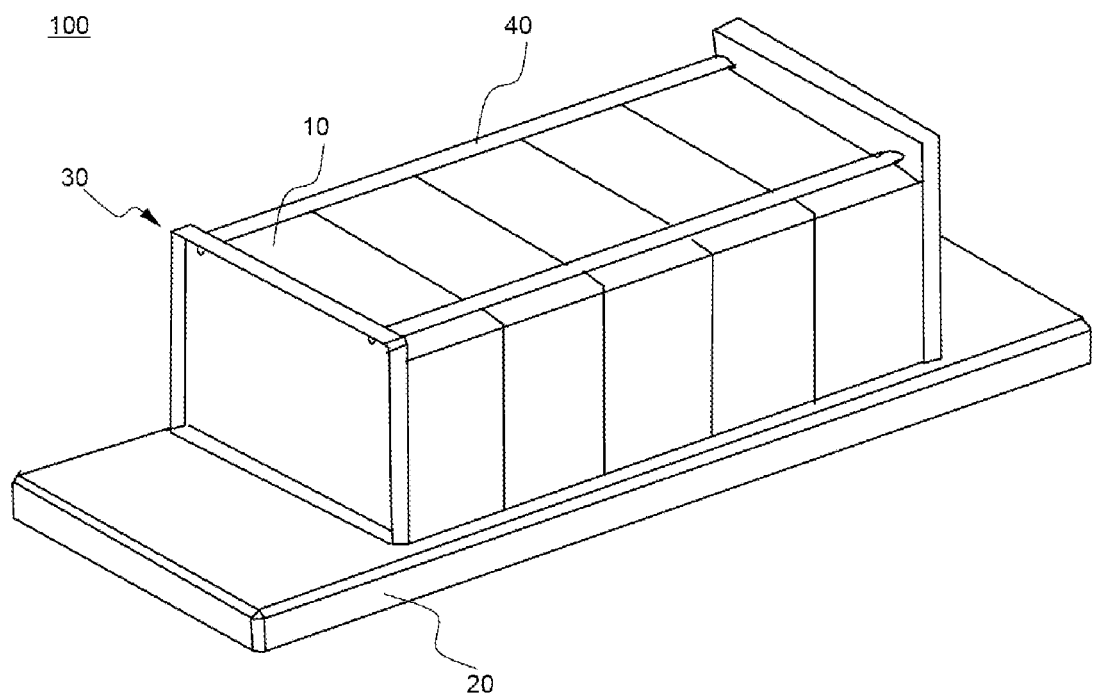
FIG. 1 is a perspective view showing a conventional battery pack.
Figure 2:
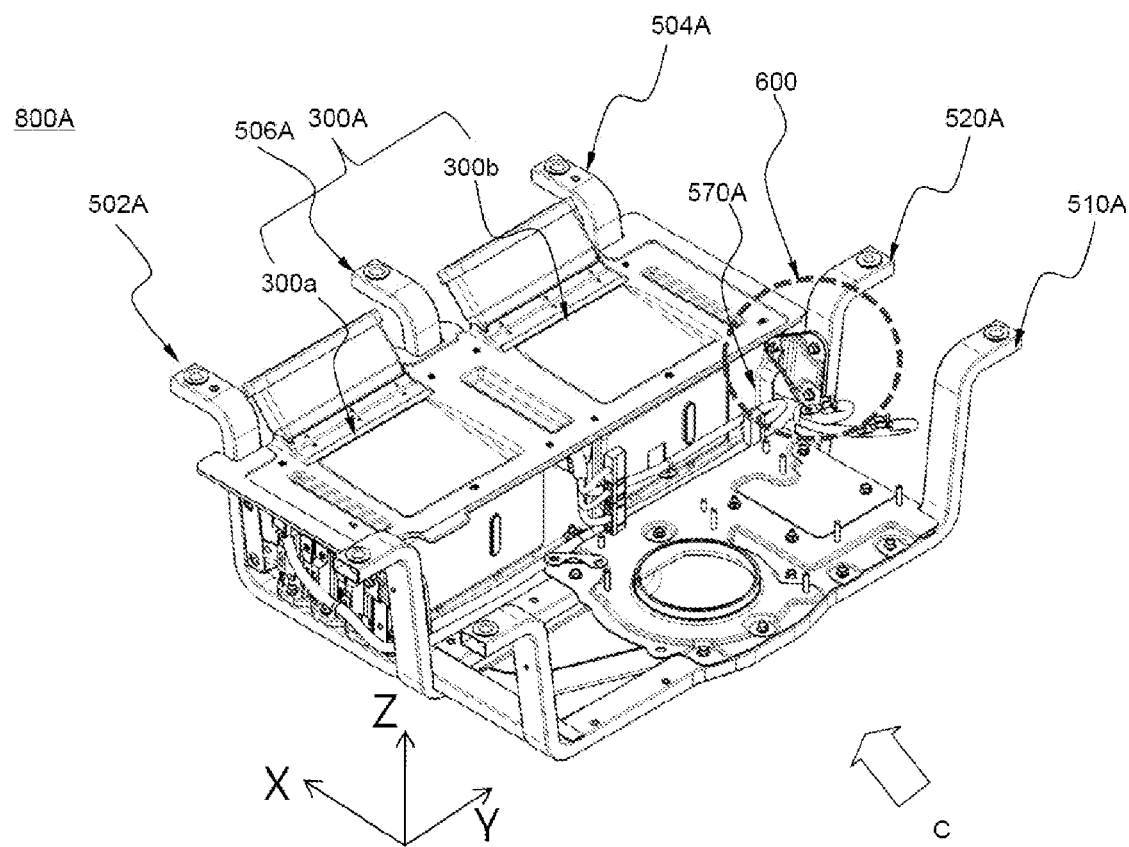
FIG. 2 is a perspective view showing the upper part of a battery pack including a triangular bracket according to an embodiment of the present invention.
Figure 3:
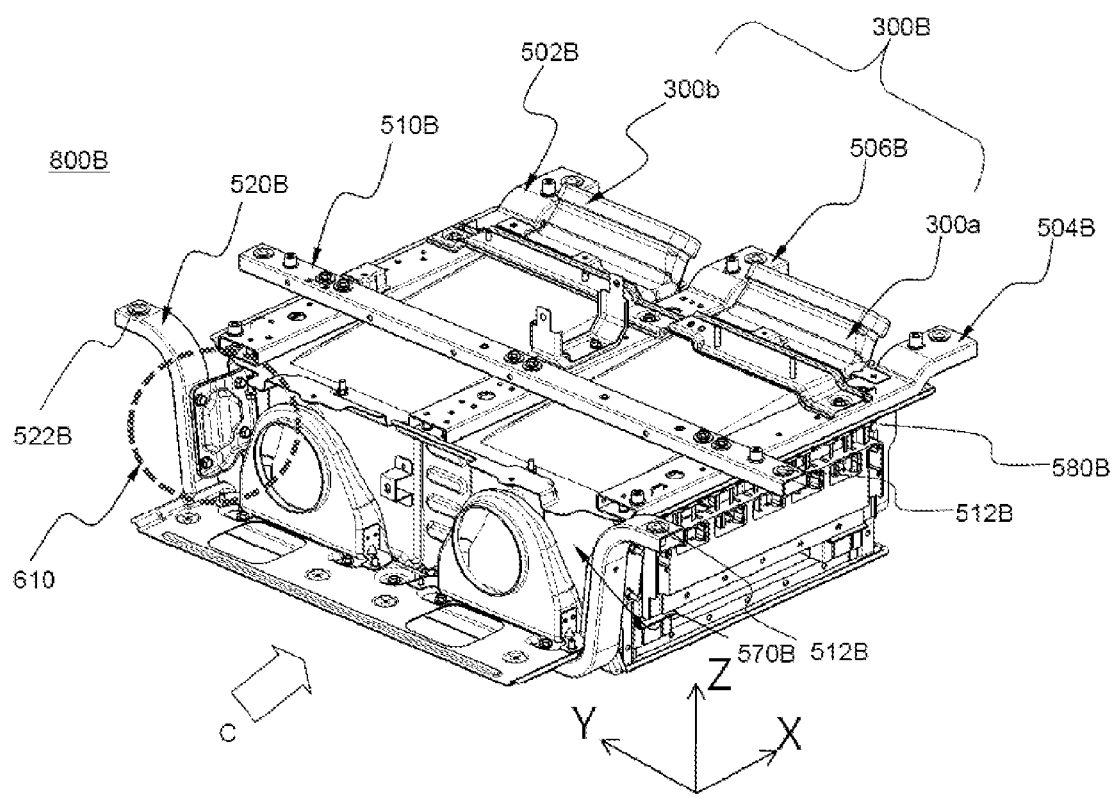
FIG. 3 is a perspective view showing the upper part of a battery pack including a quadrangular bracket according to another embodiment of the present invention.
Figure 4:
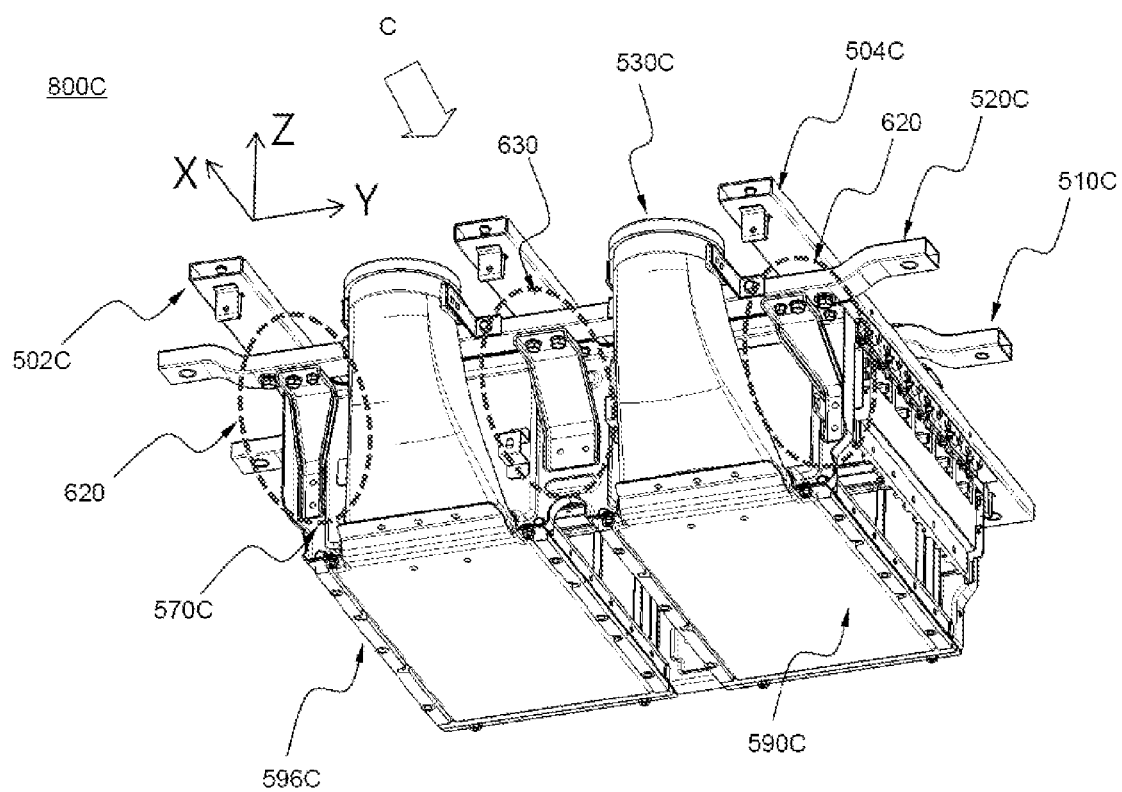
FIG. 4 is a perspective view showing the lower part of a battery pack including a step type bracket according to a further embodiment of the present invention.

FIGS. 2 to 4 show battery packs according to the present invention with some components being selectively removed for easy understanding. However, it is possible to easily understood overall constructions of the battery packs from the description of the present invention with reference to the drawings.

First, FIG. 2 is a perspective view showing the upper part of a battery pack including a triangular bracket according to an embodiment of the present invention.

Referring to FIG. 2, a battery pack 800A includes a battery module array 300A, a pair of side supporting members, i.e. a front supporting member 570A and a rear supporting member (not shown), lower end supporting members (not shown), three first upper mounting members 502A, 504A, and 506A, a second upper mounting member 510A, and a rear mounting member 520A.

A triangular bracket 600 is coupled between the front supporting member 570A and the rear mounting member 520A to distribute load of the battery modules to the rear mounting member 520A via the front supporting member 570A.

The battery module array 300A includes battery modules 300a and 300b, each of which includes unit modules stacked while being erected in an upside-down fashion, arranged in two rows. The front supporting member 570A and the rear supporting member (not shown) support the front and the rear of the battery module array 300A, respectively, in tight contact with the outermost battery modules of the battery module array 300A.

The lower end supporting members (not shown) are coupled to the lower ends of the front supporting member 570A and the rear supporting member (not shown) to support the lower end of the battery module array 300A.

Also, the three first upper mounting members 502A, 504A, and 506A are coupled to the upper ends of the front supporting member 570A and the rear supporting member (not shown) and the lower ends of the battery modules 300a and 300b, which are erected in the upside-down fashion. One end of each of the three first upper mounting members 502A, 504A, and 506A is fastened to an external device.

The second upper mounting member 510A is configured to have a U-shaped frame structure. The second upper mounting member 510A is disposed at the front of the battery module array 300A. Opposite ends of the second upper mounting member 510A are fastened to an external device (for example, a vehicle).

The triangular bracket 600 has one end coupled to the front supporting member 570A and the other two ends coupled to the rear mounting member 520A.

As a result, the rear mounting member 520A, to which the triangular bracket 600 is coupled, partially supports load of the battery pack.

FIG. 3 is a perspective view showing the upper part of a battery pack including a quadrangular bracket according to another embodiment of the present invention.

Referring to FIG. 3, a second upper mounting member 510B is coupled to the upper ends of first upper mounting members 502B, 504B, and 506B such that the second upper mounting member 510B intersects the first upper mounting members 502B, 504B, and 506B at right angles. Opposite ends of the second upper mounting member 510B are fastened to an external device (for example, a vehicle).

Also, opposite ends of a rear mounting member 520B are bent upward in parallel to the second upper mounting member 510B. At the bent portions of the rear mounting member 520B are formed fastening holes 522B for easy coupling to the external device.

According to circumstances, the opposite ends of the second upper mounting member 510B may be bent downward in parallel to the rear mounting member 520B. At the bent portions of the second upper mounting member 510B may be formed fastening holes 512B for easy coupling to the external device.

The first upper mounting members 502B, 504B, and 506B, the second upper mounting member 510B, and the rear mounting member 520B are formed in the shape of a hollow quadrangular bar, i.e. a quadrangular pipe, in vertical section.

Opposite ends of one side of a quadrangular bracket 610 are coupled to a front supporting member 570B, and opposite ends of the other side of the quadrangular bracket 610 are coupled to the rear mounting member 520B. As a result, the quadrangular bracket 610 supports load of the battery pack. The other constructions of the battery pack according to this embodiment are identical to those of the battery pack shown in FIG. 2, and therefore, a detailed description thereof will be omitted.

FIG. 4 is a perspective view showing the lower part of a battery pack including a step type bracket according to a further embodiment of the present invention.

Referring to FIG. 4, a lower plate 590C is formed of an injection-molded polymer resin.

One end of a step type bracket 620 is coupled to a front supporting member 570C, and the other end of the step type bracket 620 is coupled to the bottom of a rear mounting member 520C.

In this embodiment, two step type brackets 620 are provided, and an auxiliary bracket 630 is mounted between the step type brackets 620. Consequently, the three brackets uniformly support load of the battery pack, thereby further improving durability of the battery pack against vibration. The other constructions of the battery pack according to this embodiment are identical to those of the battery pack shown in FIG. 3, and therefore, a detailed description thereof will be omitted.

The other members of FIG. 5 are substantially identical or similar to those of FIG. 3 denoted by corresponding reference numerals.

INDUSTRIAL APPLICABILITY

As is apparent from the above description, a battery pack according to the present invention includes a bracket coupled between side supporting members and a rear mounting member. Consequently, it is possible to effectively support vibration of the battery pack in the forward and backward direction and load of the battery pack.

Also, the battery pack according to the present invention includes a battery module array assembled to first upper mounting members, a second upper mounting member, lower end support members, and a rear mounting member, which are formed in the shape of a quadrangular pipe. Consequently, it is possible to support weight of the battery pack through the quadrangular pipe-shaped members.

In addition, a portion of the battery pack is formed using some of the shape of a vehicle. Consequently, it is possible to stably install the battery pack in the vehicle and to minimize volume of the battery pack in the vehicle.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A battery pack comprising:
   (a) a battery module array having battery modules arranged in two or more rows, each of the battery modules being configured to have a structure in which battery cells or unit modules, each of which has two or more battery cells mounted therein;
   (b) a pair of side supporting members including a front supporting member and a rear supporting member to support a front and rear of the battery module array, respectively, in tight contact with outermost battery modules of the battery module array;
   (c) lower end supporting members coupled to lower ends of the side supporting members to support a lower end of the battery module array;
   (d) two or more first upper mounting members coupled to upper ends of the side supporting members and lower ends of the battery modules, one end of each of the first upper mounting members being fastened to an external device;
   (e) a second upper mounting member coupled to upper ends of first upper mounting members such that the second upper mounting member intersects the first upper mounting members at right angles, opposite ends of the second upper mounting member being fastened to the external device;
   (f) a rear mounting member disposed at a rear of the battery module array, opposite ends of the rear mounting member being fastened to the external device; and (g) a bracket coupled between at least one of the side supporting members and the rear mounting member to distribute load of the battery modules to the rear mounting member via the side supporting members.

2. The battery pack according to claim 1, wherein each of the side supporting members is formed in a rectangular shape on plane.

3. The battery pack according to claim 1, further comprising a lower plate mounted to lower parts of the lower end supporting members, opposite ends of the lower plate being coupled to the side supporting members.

4. The battery pack according to claim 1, wherein the first upper mounting members comprise two end members coupled to opposite ends of the battery module array and a middle member coupled to a middle of the battery module array.

5. The battery pack according to claim 1, wherein the end of each of the first upper mounting members fastened to the external device is bent upward by a height of the second upper mounting member.

6. The battery pack according to claim 1, further comprising an upper plate mounted between the battery module array and the first upper mounting members.

7. The battery pack according to claim 1, wherein the rear mounting member is configured to have a U-shaped frame structure to cover opposite sides and a bottom of a cooling fan mounted at fronts of the battery modules.

8. The battery pack according to claim 1, wherein the opposite ends of the rear mounting member are bent in parallel to the second upper mounting member for easy coupling to the external device, and fastening holes are formed at the bent portions of the rear mounting member.

9. The battery pack according to claim 1, wherein the bracket has one end coupled to the side supporting members and the other end coupled to the rear mounting member, the bracket being bent so as to correspond to a space between the side supporting members and the rear mounting member, to which the bracket is mounted.

10. The battery pack according to claim 1, wherein the bracket is coupled to the rear mounting member adjacent to the front supporting member in a symmetrical fashion.

11. The battery pack according to claim 1, wherein the bracket is a triangular bracket, a quadrangular bracket, and a step type bracket.

12. The battery pack according to claim 11, wherein the triangular bracket has one end coupled to the front supporting member and the other ends coupled to the rear mounting member.

13. The battery pack according to claim 11, wherein the step type bracket has one end coupled to the front supporting member and the other end coupled to a bottom of the rear mounting member.

14. The battery pack according to claim 13, further comprising an auxiliary bracket mounted between a pair of step type brackets.

15. A vehicle comprising a battery pack according to claim 1 as a power source.

16. The vehicle according to claim 15, wherein the vehicle is an electric vehicle, a hybrid electric vehicle, or a plug-in hybrid electric vehicle.

17. The vehicle according to claim 15, wherein the battery pack is installed in a lower end of a trunk of the vehicle or between a rear seat and the trunk of the vehicle.

* * * * *